United States Patent [19]

Nioloux

[11] 4,440,283
[45] Apr. 3, 1984

[54] FRICTION CLUTCH DRIVEN PLATE

[75] Inventor: Raymond Nioloux, Saint Ouen, France

[73] Assignee: Automotive Products Limited, Warwickshire, England

[21] Appl. No.: 300,648

[22] Filed: Sep. 9, 1981

[30] Foreign Application Priority Data

Sep. 10, 1980 [FR] France .................................. 80 19499

[51] Int. Cl.³ ............................ F16D 3/14; F16D 3/66
[52] U.S. Cl. ................................ 192/106.2; 192/106.1; 464/68
[58] Field of Search ......................... 192/106.1, 106.2; 464/64, 66, 68, 63

[56] References Cited

U.S. PATENT DOCUMENTS

| 3,414,101 | 12/1968 | Binder et al. | 464/68 X |
| 3,534,841 | 1/1969 | Schneider et al. | 192/106.2 |
| 4,212,380 | 7/1980 | Billet | 192/106.2 |

FOREIGN PATENT DOCUMENTS 1952620  7/1978  Fed. Rep. of Germany ... 192/106.2

Primary Examiner—Rodney H. Bonck
Assistant Examiner—David D. House
Attorney, Agent, or Firm—Kemon & Estabrook

[57] ABSTRACT

This invention relates to clutch driven plates for motor vehicles and which comprise a hub having a circumferential flange, a co-axial friction facing carrier mounted on the hub and capable of rotational movement about the hub, and a co-axial intermediate drive means mounted on the hub for rotational movement relative to both the hub and facing carrier. Rotation of the facing carrier relative to the intermediate drive means is resisted by the larger springs and rotation of the intermediate drive means relative to the hub is resisted by softer springs. The construction of the plate is such that the drive means comprises two annular drive plates aranged one on each side of the hub flange and which are rotationally engaged with the hub by loosely engaging splines that allow for limited movement of the two plates around the hub.

4 Claims, 4 Drawing Figures

FRICTION CLUTCH DRIVEN PLATE

This invention relates to friction clutch driven plates particularly, but not exclusively, for use in the transmission systems of automobiles.

A problem associated with automobile transmission systems is that when there is substantially no drive load or overrun load on the transmission then parts in the transmission drive line eg. gears, drive shaft, are capable of setting up vibrations. The vibrations in the drive line cause noise and gearbox chatter that is unpleasant for the driver of the vehicle.

In order to damp out the vibrations it is known to have a friction clutch driven plate in which the torque load through the driven plate passes through two sets of damping springs arranged in series with each other. The normal drive load passes through a main torsion damping spring and the vibration load passes through a much softer auxiliary vibration damping spring. The main springs only operate after the vibration damping springs have been loaded by a predetermined amount, and these auxiliary springs are then by-passed when the main damping springs operate. Such a driven plate is shown in British Pat. No. 1,167,749 (equivalent to U.S. Pat. No. 3,414,101).

The object of the present invention is to provide a clutch driven plate having main torsion damping springs and a vibration damping spring, and which is a more compact construction than the aforementioned prior art.

Accordingly there is provided a friction clutch driven plate comprising a hub having a circumferential flange, a co-axial friction facing carrier mounted on the hub and capable of limited angular rotation about the hub, and a co-axial intermediate drive means mounted on the hub for limited angular rotation relative to both the hub member and facing carrier, rotation of the facing carrier relative to the intermediate drive means being resisted by main torsion damping springs, and rotation of the intermediate drive means relative to the hub being resisted by a softer auxiliary spring, characterised in that the drive means comprises two aligned co-axial annular drive plates arranged one on each side of the hub flange and which are rotationally engaged with the hub by loosely engaging splines that allow limited relative angular rotation of the plates around the hub.

Preferably the facing carrier comprises a facing carrier plate and a counter plate which are arranged one on each side of the two annular drive plates, and each main spring is accommodated in aligned apertures in said plates, and each auxiliary spring is accommodated in aligned apertures in the hub flange and the two annular drive plates.

The invention will be described by way of example and with reference to the accompanying drawings in which.

Figure 1:
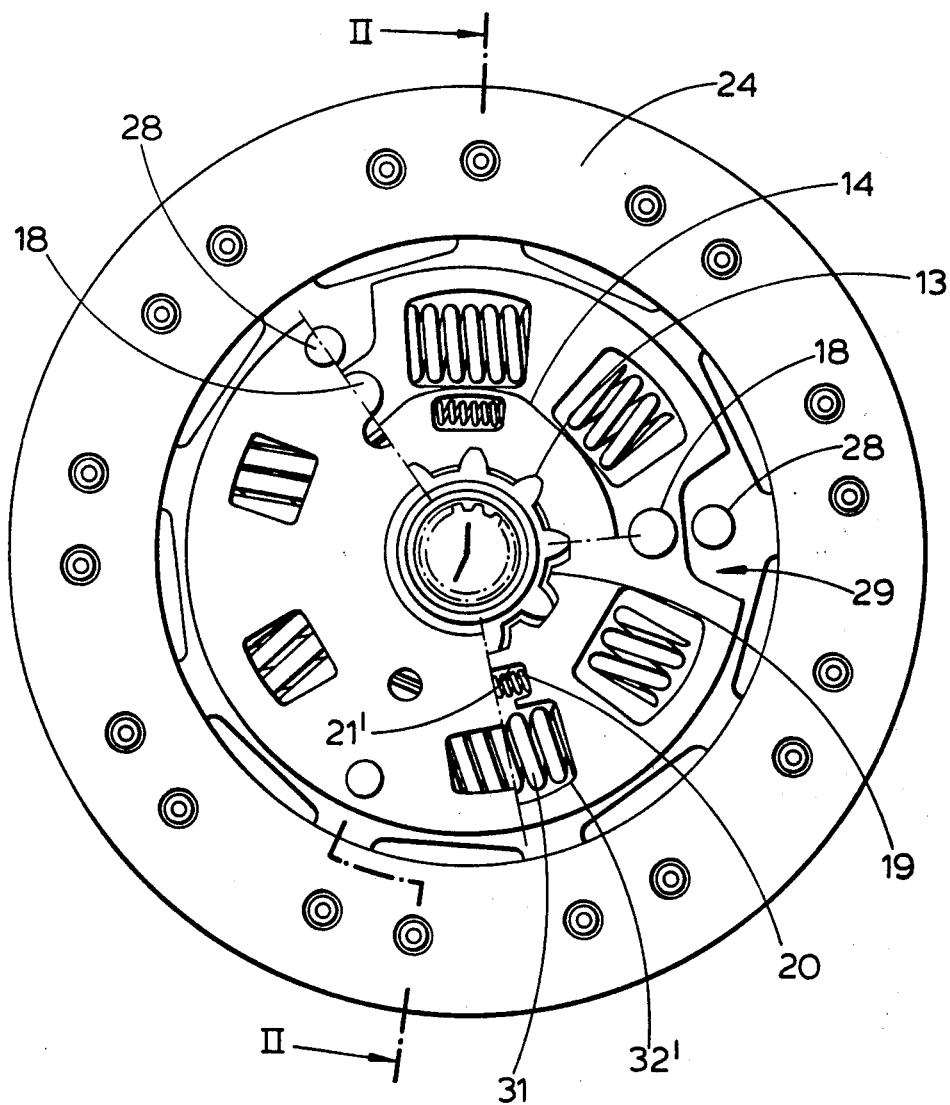
FIG. 1 is a view of a driven plate according to this invention, showing part of the counter plate removed in one sector of the drawing and the counter plate and a drive plate removed in another sector of the drawing.
Figure 2:
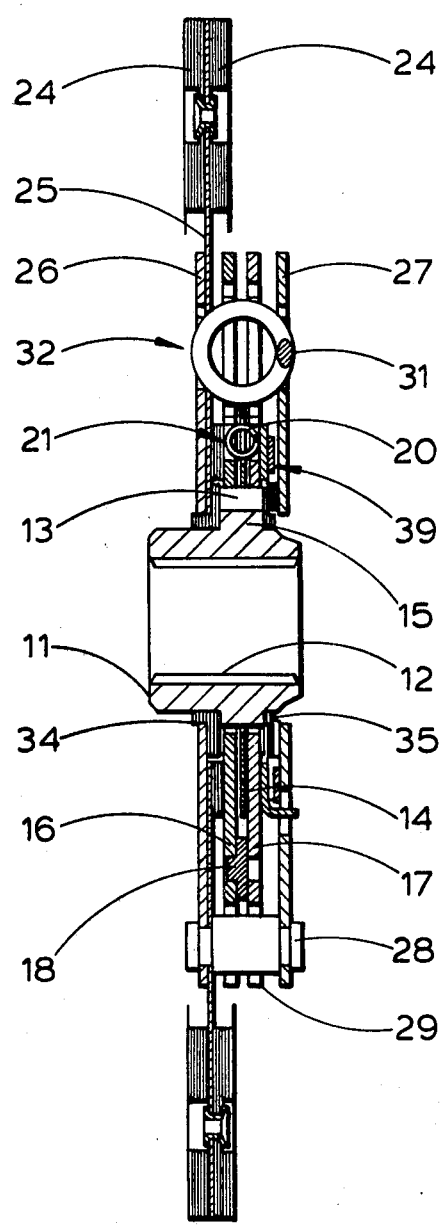
FIG. 2 is a section on the line II—II of FIG. 1.
Figure 3:
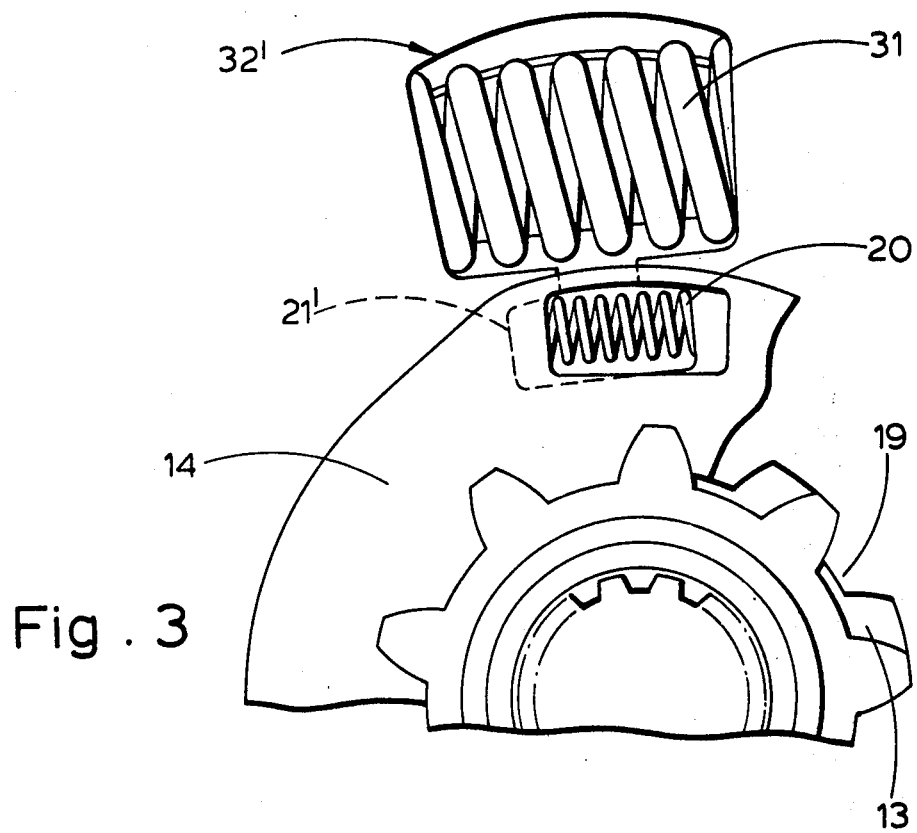
FIG. 3 illustrates a portion of the plate as in FIG. 1 with the counter plate and one of the drive plates removed to show the centre of the plate in the Drive mode.
Figure 4:
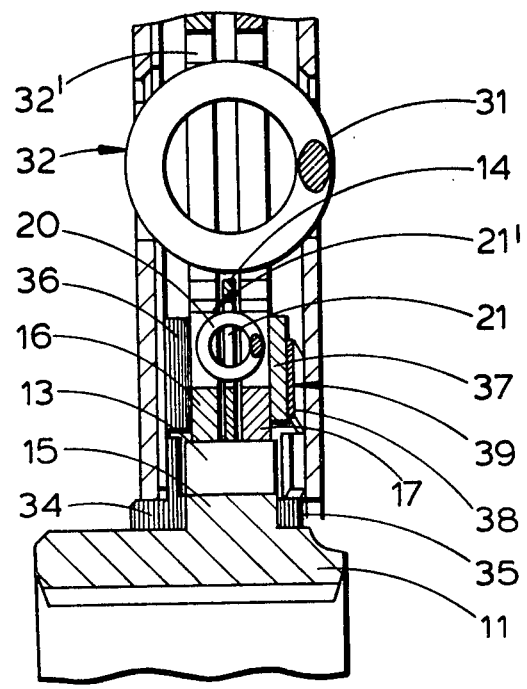
FIG. 4 is a detailed view from FIG. 2.

With reference to FIGS. 1 to 4 the driven plate comprises an annular hub 11 having internal splines 12 for mating with the input shaft of a gearbox (not shown). The hub 11 has a shoulder 15 on its radially outer surface, said shoulder 15 having external splines 13 which engage with the toothed inner periphery of a circumferential annular flange 14 to hold the flange 14 rotationally fast with the hub 11 but allow the flange 14 to move axially relative to the hub 11.

A pair of aligned co-axial annular drive plates 16 and 17 are arranged on the shoulder 15, one on each side of the flange 14 and are spaced apart from each other by three spacers 18 which are arranged equangularly apart radially outside the flange 14. The spacers 18 prevent the drive plates 16 and 17 from squeezing the flange 14 between them. The inner periphery of each drive plate 16 or 17 has inwardly projecting teeth 19, that loosely engage with the splines 13 so that the drive plates 16 and 17 are capable of limited relative rotational movement about the hub 11. The total movement of the teeth 19 in the splines 13 is about 12°. The drive plates 16 and 17 are held rotationally fast with each other by main damping springs 31 that are accommodated in aligned apertures 32 in the plates.

The relative rotational movement between the drive plates 16 and 17 and the hub 11 is restrained by two auxiliary springs 20 which are arranged in diametrically opposite sets of aligned apertures 21 in the drive plates 16, 17 and the flange 14. The two springs 20 are very soft and absorb the vibrations set up in the transmission system.

The driven plate friction facings 24 are arranged in a known manner on a spring steel cushioning plate 25. The radially inner portion of the cushioning plate 25 is supported, on its side away from the flange 14, by a facing carrier plate 26 which is arranged on one side of the two annular drive plates 16 and 17. The carrier plate 26 is rigidly connected by three stop pins 28 to a counter plate 27 arranged on the other side of the two drive plates. The stop pins 28 pass through apertures 29 in the outer margin of the drive plates 16 and 17 and also secure the cushioning plate 25 to the facing carrier plate 26. The friction facing carrier formed by the plates 25, 26 and 27 is free to rotate about the hub 11 the rotation being limited by the abutment of the stop pins 28 with the edges of the apertures 29.

The facing carrier rotates about the hub 11 on two polyamide bearings 34 and 35, arranged respectively between the facing carrier plate 26 and the hub 11, and the counter plate 27 and the hub. The bearing 34 has a radial flange that prevents the cushioning plate 25 from rubbing on the shoulder 15.

The two polyamide bearings 34 and 35 reduce the frictional engagement between the plates 25, 26 and 27, and the hub 11 to a minimum.

The relative rotational movement of the facing carrier about the hub 11 is restrained by six tangentially aligned compression springs 31 (tangential with respect to the rotation of the clutch driven plate). The six springs 31 provide the main torsion damping means when the driven plate is under a transmission drive load and are housed in sets of aligned apertures 32 in the five plates 25, 26, 27, 16 and 17. The apertures 32 are radially outwards of the other spring apertures 21. These springs 31 serve to restrain relative angular rotation between the friction facing carrier and the two drive plates 16 and 17 which therefore act as an intermediate drive means between the facing carrier and the hub. The main damping springs 31 are much stronger than the auxiliary springs.

A friction damper 39 constituted by the friction washers 36 and 37, and the spring washer 38 is arranged to damp the relative rotational movement between the drive plates 16 and 17 and the facing carrier.

The two drive plates 16 and 17 each have apertures 32′ for the main damping springs, and apertures 21′ for the auxiliary vibration damping springs. The apertures 32′ are radially outside the apertures 21′ and are arranged so that the two apertures 21′ are radially aligned and are interconnected with two of the mainspring apertures 32′.

When the hub is held stationary and the friction facings are moved in an anticlockwise direction in FIG. 1 the driven plate works in the following manner:

The main damping springs 31 serve to lock the facing carrier rotationally fast with the drive plates 16 and 17 for small torsional loads on the driven plate. This is because they are so much stronger than the auxiliary springs 20, and therefore the main springs will not begin to operate until the play between the loosely engageable splines 13 and teeth 19 on the drive plate 16 and 17 has been taken up (see FIG. 3). This is after approximately 6° of movement of the facing carrier.

Hence for the first 6° of movement the facing carrier rotates in a substantially friction free manner on the bearings 34 and 35 about the hub 11 and causes the drive plates 16 and 17 to rotate therewith. These in turn compress the auxiliary springs 20 which act to restrain rotation between the drive plates 16 and 17 and the hub.

After 6° of movement, the teeth 19 on the drive plates abut the splines 13 and prevent further anticlockwise rotational movement of the drive plates 16 and 17. Thereafter further movement of the facing carrier compresses the main damping springs 31. The springs 31 can be arranged to operate, as is well known, in a step wise manner after different degrees of rotation. The movement of the facing carrier relative to the drive plates 16 and 17 also causes the friction damper 39 to operate. The anticlockwise movement will continue until the stop pins 28 abut the edges of the apertures 29, for example, after 14° total rotation.

During the return movement, the reverse operation takes place except the friction damper 39 will have introduced some hysteresis into the relative movement between the facing carrier and the drive plates 16 and 17. In order to ensure that the facing carrier is returned to a zero position relative to the drive plates 16 and 17 it will be necessary for one of springs 31 to be pre-stressed in its aligned set of apertures 32.

I claim:

1. A friction clutch driven plate comprising:
   a hub having splines on the outer surface thereof and a hub flange rotationally fast therewith;
   a friction facing carrier co-axially mounted on the hub and capable of limited angular rotation relative thereto, said carrier comprising a facing carrier plate and a counter plate which are arranged one on each side of the hub flange;
   an intermediate drive means co-axially mounted on the hub and capable of limited angular rotation relative to both the hub and the facing carrier, said drive means comprising two co-axial annular drive plates arranged one on each side of the hub flange, one of the drive plates being interposed between the facing carrier plate and the hub flange and the other of the drive plates being interposed between the counter plate and the hub flange, the drive plates being rotationally engaged with the hub by splines which loosely mesh with the splines on the hub to provide the limited rotation of said drive plates about the hub;
   main torsion damper springs resisting rotation of the carrier relative to the intermediate drive means, each of said main spring being accommodated in aligned apertures in the drive plates, the facing carrier plate and the counter plate; and
   auxiliary damping springs, softer than said main springs, resisting rotation of the drive means relative to the hub, each of said auxiliary springs being accommodated in aligned apertures in the hub flange and the two annular drive plates.

2. A clutch driven plate as claimed in claim 1, wherein the main spring apertures in the two annular plates are radially outside the auxiliary spring apertures.

3. A clutch driven plate as claimed in claim 2, wherein the respective aligned apertures for each auxiliary spring are each radially aligned with an aperture for a main spring.

4. A driven plate as claimed in claim 3, wherein each auxiliary spring aperture in the two annular plates is interconnected with the adjacent radially aligned main spring aperture to form a large aperture having two portions each housing a respective main or auxiliary spring.

* * * * *